United States Patent

Schmidt et al.

[11] Patent Number: 6,017,389
[45] Date of Patent: Jan. 25, 2000

[54] THIN SIO$_2$ FILMS, A PROCESS FOR PRODUCING THEM AND THEIR USE

[75] Inventors: Helmut Schmidt, Saarbrücken-Güdingen; Martin Mennig, Quierschied; Gerhard Jonschker, Spiesen-Elversberg; Navin Suyal, Saarbrücken, all of Germany

[73] Assignee: Institute fuer neue Materialen gemeinnuetzige GmbH, Saarbruecken, Germany

[21] Appl. No.: 09/043,283

[22] PCT Filed: Sep. 17, 1996

[86] PCT No.: PCT/EP96/04069

§ 371 Date: Mar. 19, 1998

§ 102(e) Date: Mar. 19, 1998

[87] PCT Pub. No.: WO97/11035

PCT Pub. Date: Mar. 27, 1997

[30] Foreign Application Priority Data

Sep. 19, 1995 [DE] Germany ............... 195 34 764
Sep. 20, 1995 [DE] Germany ............... 195 34 980

[51] Int. Cl.$^7$ .................................. C09D 183/04
[52] U.S. Cl. .................. 106/287.1; 106/287.11; 106/287.12; 106/287.13; 106/287.14; 106/287.15; 501/12; 210/500.1; 428/447
[58] Field of Search .................. 501/12; 106/287.1, 106/287.11, 287.15; 210/500.1; 428/447

[56] References Cited

U.S. PATENT DOCUMENTS 5,496,402  3/1996  Sakamoto et al. .................. 501/12
5,858,280 12/1999  Zhang et al. .................. 501/12

*Primary Examiner*—David Brunsman
*Attorney, Agent, or Firm*—Heller Ehrman White & McAuliffe

[57] ABSTRACT

Thin SiO$_2$ films can be produced by hydrolysis and condensation of a) 40 to 100% by weight of one or more silanes of general formula (I)

$$R_x\text{—Si—}A_{4-x} \qquad (I)$$

in which the groups A are identical or different and stand for hydroxyl groups or hydrolytically separable groups, the groups R are identical or different and stand for hydrolytically non-separable groups, x has the value 0, 1, 2 or 3, x being not less than 1 for 70% by moles of said silanes;

b) optionally in the presence of 0 to 50% by weight of colloidal SiO$_2$ and/or c) 0 to 10% by weight of organic binder.

The viscous sol thus obtained is worked into a gel film which is heat-treated.

17 Claims, No Drawings

THIN SIO$_2$ FILMS, A PROCESS FOR PRODUCING THEM AND THEIR USE

The present invention relates to thin, tearfree, preferably transparent and colorless SiO$_2$ films, a process for producing them according to the sol-gel process and their use as, e.g., membranes, filters, components of laminates or support materials having functional additives incorporated therein.

Films made of glass are usually produced by drawing or extrusion processes from the melt. Said processes depend on the thermal properties of the glass (softening point, crystallization rate etc.) and thus limited to specific glass compositions. There is a further limitation regarding the minimum thickness of the glass films which can be produced, this being the reason that so far it has not been possible to produce films of silica glass having a thickness below about 250 μm by melt and subsequent molding processes.

It is known that by sol-gel techniques the densification temperature of vitreous and/or ceramic materials can be substantially reduced. However, the production of SiO$_2$ films according to the sol-gel process has so far been prevented by the problems in the conversion of the mostly aqueous-alcoholic precursors (sols) to xerogel bodies by solvent removal or addition of a gelling agent. In the drying process of sols on substrates the formation of tears can easily take place due to capillary forces and according to different drying rates at the upper and lower side, respectively. Furthermore, due to the preferential solvent evaporation at the surface in the course of the drying operation said gel films separate from the substrate and roll up. A process according to which transparent, tearfree SiO$_2$ films having larger dimensions can be produced by casting and gelling of SiO$_2$ sols on a base has not been known.

Surprisingly it has now been found that thin SiO$_2$ films of substantially any dimensions (length and width) can very easily be produced in a sol-gel process.

Object of the present invention is a process for the production of thin SiO$_2$ films which is characterized in that a) 40 to 100% by weight of one or more silanes of general formula (I)

$$R_x\text{—Si—}A_{4-x} \quad (I)$$

wherein the radicals A are the same or different and represent hydroxyl groups or hydrolytically removable groups, the radicals R are the same or different and are hydrolytically non-removable groups and x represents 0, 1, 2 or 3, provided that x≧1 in at least 70% by moles of said silanes; optionally in the presence of b) 0 to 50, preferably 0 to 25% by weight of colloidal SiO$_2$ and/or c) 0 to 10% by weight of an organic binder are hydrolyzed and condensed, the resulting viscous sol is worked into a gel film and said gel film is heat-treated.

Objects of the present invention also are SiO$_2$ films which can be produced in said manner and SiO$_2$ films having a thickness of 2.5 to 250 μm and a surface area of at least 25 cm$^2$, preferably at least 50 cm$^2$, particularly preferred at least 100 cm$^2$.

The SiO$_2$ films according to the present invention are thin, tearfree, preferably transparent and colorless, and are characterized by a high flexibility and minimum shrinkage.

Details regarding the sol-gel process are disclosed in C. J. Brinker, G. W. Scherer: "Sol-Gel Science—The Physics and Chemistry of Sol-Gel-Processing", Academic Press, Boston, San Diego, New York, Sidney (1990), and in DE 1941191, DE 3719339, DE 4020316 and DE 4217432.

Said references also describe specific examples of the silanes which can be employed in the process according to the present invention as well as of hydrolytically removable radicals A and hydrolytically non-removable radicals R.

Preferred examples of hydrolytically removable groups A are hydrogen, halogen (F, Cl, Br and I, particularly Cl and Br), alkoxy (particuarly C$_{1-4}$ alkoxy such as methoxy, ethoxy, n-propoxy, i-propoxy and butoxy), aryloxy (particularly C$_{6-10}$ aryloxy, e.g. phenoxy), alkaryloxy (e.g. benzyloxy), acyloxy (particularly C$_{1-4}$ acyloxy such as acetoxy and propionyloxy) and alkylcarbonyl (e.g. acetyl). Radicals A which are also useful include amine groups (e.g. mono- or dialkyl, aryl and aralkyl amino groups featuring the above mentioned alkyl, aryl and aralkyl radicals), amide groups (e.g. benzamido) and aldoxime or ketoxime groups. Furthermore, two or three radicals A together may form a grouping complexing the Si atom, this being the case e.g. with Si-polyol complexes derived from glycol, glycerol or brenzcatechol.

The above hydrolyzable groups A may optionally have one or more usual substituents, e.g., halogen atoms or alkoxy groups.

The hydrolytically non-removable radicals R are preferably selected from alkyl (particularly C$_{1-4}$ alkyl such as methyl, ethyl, propyl and butyl), alkenyl (particularly C$_{2-4}$ alkenyl, such as vinyl, 1-propenyl, 2-propenyl and butenyl), alkynyl (particularly C$_{2-4}$ alkynyl such as acetylenyl and propargyl), aryl (particularly C$_{6-10}$ aryl such as phenyl and naphthyl) and the corresponding alkaryl and arylalkyl groups. Optionally, these groups may also feature one or more usual substituents such as halogen, alkoxy or epoxide groups.

The above mentioned alkyl, alkenyl and alkynyl groups include the corresponding cyclic radicals, such as e.g. cyclohexyl.

The silanes of general formula (I) employed according to the present invention may be employed, completely or in part, in the form of precondensates, i.e., compounds which have been formed by partial hydrolysis or the silanes of formula (I), either alone or in mixture with other hydrolyzable compounds. Such oligomers which are preferably soluble in the reaction medium may be straight-chain or cyclic low molecular weight partial condensates (polyorganosiloxanes) having a degree of condensation of e.g. about 2 to 100, particularly about 2 to 6.

Specific examples of silanes of general formula (I) are compounds of the following formulae:

Si(OCH$_3$)$_4$, Si(OC$_2$H$_5$)$_4$, Si(O-n- or i-C$_3$H$_7$)$_4$, Si(OC$_4$H$_9$)$_4$, SiCl$_4$, HSiCl$_3$, Si(OOCCH$_3$)$_4$, CH$_3$—SiCl$_3$, CH$_3$—Si(OC$_2$H$_5$)$_3$, C$_2$H$_5$—SiCl$_3$, C$_2$H$_5$—Si(OC$_2$H$_5$)$_3$, C$_3$H$_7$—Si(OCH$_3$)$_3$, C$_6$H$_5$—Si(OCH$_3$)$_3$, C$_6$H$_5$—Si(OC$_2$H$_5$)$_3$, (CH$_3$O)$_3$—Si—C$_3$H$_6$—Cl, (CH$_3$)$_2$SiCl$_2$, (CH$_3$)$_2$Si(OCH$_3$)$_2$, (CH$_3$)$_2$Si(OC$_2$H$_5$)$_2$, (CH$_3$)$_2$Si(OH)$_2$, (C$_6$H$_5$)$_2$SiCl$_2$, (C$_6$H$_5$)$_2$Si(OCH$_3$)$_2$, (C$_6$H$_5$)$_2$Si(OC$_2$H$_5$)$_2$, (i-C$_3$H$_7$)$_3$SiOH, CH$_2$=CH—Si(OOCCH$_3$)$_3$, CH$_2$=CH—SiCl$_3$, CH$_2$=CH—Si(OCH$_3$)$_3$, CH$_2$=CH—Si(OC$_2$H$_5$)$_3$, CH$_2$=CH—Si(OC$_2$H$_4$OCH$_3$)$_3$, CH$_2$=CH—CH$_2$—Si(OCH$_3$)$_3$, CH$_2$=CH—CH$_2$—Si(OC$_2$H$_5$)$_3$, CH$_2$=CH—CH$_2$—Si(OOCCH$_3$)$_3$, CH$_2$=C(CH$_3$)—COO—C$_3$H$_7$—Si(OCH$_3$)$_3$, CH$_2$=C(CH$_3$)—COO—C$_3$H$_7$—Si(OC$_2$H$_5$)$_3$,

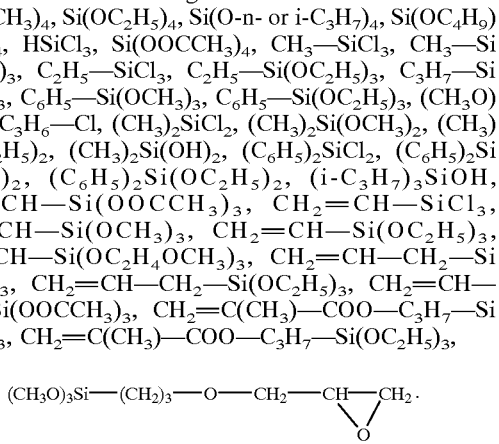

Said silanes may be prepared according to known methods; cf. W. Noll, "Chemie und Technologie der Silicone", Verlag Chemie GmbH, Weinheim/Bergstraβe (1968).

The SiO$_2$ films according to the present invention may be prepared, e.g., from methyltriethoxysilane (MTEOS) alone or from mixtures of MTEOS and tetraethoxysilane (TEOS). A particularly preferred system comprises 90% by moles of MTEOS and 10% by moles of TEOS.

In order to improve the handlability and other mechanical properties of the thin SiO$_2$ films colloidal SiO$_2$ is preferably employed as additional starting material. The use thereof also increases the density and the pore volume of the films. Said colloidal SiO$_2$ may be present, e.g., in the form of silica sols or nanoscaled dispersible powders. An alcoholic silica sol having a particle size of about 10 nm is preferred.

As further optional component an organic binder which can subsequently be removed again from the gel film may be employed. Suitable binders are, e.g., polyvinyl alcohol, polyvinyl acetate, starch, polyethylene glycol and gum arabic.

The hydrolysis and condensation is carried out under sol-gel conditions, preferably in an alcoholic solvent (e.g. methanol or ethanol) with basic catalysis (e.g., using ammonia) until a viscous sol has formed. In order to adjust a favourable morphology of the sol particles and viscosity of the sol the hydrolyzed/condensed product is preferably subjected to an aging step wherein the reaction mixture is heated to temperatures of from 40 to 120° C. for several hours to several days. Heating to 80° C. for 4 days is particularly preferred. This results in a sol having a viscosity of preferably 5 to 100 Pas, particularly preferred 20 to 25 Pas.

Subsequently said sol can be processed into a gel film in various ways, for example by casting and gelling on a substrate or in a mold, film drawing, blowing techniques or forcing through a dye, the gelling taking place by evaporation of the solvent and/or addition of gelling agents (e.g. H$_2$O, HCl or NH$_3$). Particularly preferred are casting or doctor blade coating onto a non-adhesive base made of, e.g., polystyrene, polyethylene or teflon and evaporation of the solvent. The gelling of the sol may also take place continuously, e.g., on a roller or a conveyer belt.

In a particularly preferred system composed of 90% by moles of MTEOS and 10% by moles of TEOS it has surprisingly been found that with basic catalysis and a temperature of 80° C. said system does not condense to any substantial degree even after a period of 100 h. This is in contradiction to conventional experience according to which the presence of basic catalysts accelerates the condensation reaction. On the other hand, the system according to the present invention becomes almost completely hydrolyzed but not condensed, so that no gelling takes place. As a result thereof, upon pouring the sol into a mold, the solvent may evaporate without gelling taking place. Only after the solvent has evaporated almost completely, a gelling process with formation of a gel film sets in.

The resulting gel film is then dried, preferably at temperatures of from room temperature to 100° C. and under normal pressure or reduced pressed. Particularly preferred drying conditions are 20 to 30° C. for 3 h, followed by 15 h at 50° C.

The gel body obtained can optionally be subjected to various pretreatments. For example, it can be shaped by mechanical or chemical treatments, e.g., drilling, cutting, preliminary dissolution, etching, structuring (embossing, bombardment with ions), folding or bending.

In order to improve the mechanical properties, the gel film may optionally be placed into functional (reactive) solvents or be treated therewith, e.g., with water, alcohols, amines, Si compounds (e.g. TEOS), or may be treated with reactive gases such as HCl or NH$_3$.

Optionally a pretreatment of the gel film by means of corona or plasma generators may also be carried out.

Finally, a heat-treatment of the gel film within the temperature range of from 100 to 1400° C. is carried out, an annealing taking place below 200° C., the organic components being burnt out in the range of from 200 to 700° C. and a thermal densification (sintering) taking place above 700° C.

The heat-treatment can be effected by, e.g., heating, irradiation with infrared, laser or flash-light radiation (Rapid Thermal Annealing). Heating rates of preferably 40 to 50° C./h are employed in said treatments.

The heat-treatment can be carried out in various gas atmospheres, e.g., in air, oxygen, nitrogen, ammonia, chlorine, carbon tetrachloride or corresponding gas mixtures.

The thermal densification in air is suitable for preferably thinner SiO$_2$ films having a thickness of up to 50 $\mu$m. In that case thin transparent glass films are formed at 1000° C. Sintering in nitrogen at 1000 to 1250° C. results in black glass films having occluded carbon particles and showing high strength and being suitable, e.g., as substrates or for laminates. By sintering in ammonia it is surprisingly possible to produce also thicker glass films of excellent transparency.

The SiO$_2$ films according to the present invention show no tendency for tear formation, undesired peeling off or rolling up. Additionally, it has surprisingly been found that the organic components employed can be removed thermally without any problems and without any formation of tears so that colorless and transparent glass films whose dimensions are solely limited by the size of the base may be produced.

The SiO$_2$ films according to the present invention are suitable for the most diverse applications, e.g., as membranes, filters, components of laminates or support materials having functional additives such as magnetic particles, carbon, metal colloids, dyes (including photochromic ones) and pigments incorporated therein. Further fields of application are optical and electronic components as well as multi-layer materials for bullet-proof glazing.

The following examples illustrate the present invention.

EXAMPLE 1

A mixture of 0.92 moles of MTEOS, 0.08 moles of TEOS and 0.25 moles of colloidal SiO$_2$ (MA-ST from Nissan Chemicals; 30% in methanol) is diluted with 4.5 moles of ethanol (absolute) and hydrolyzed with 4 moles of aqueous ammonia (0.34 g of 25% aqueous ammonia in 73 g of water) with magnetic stirring.

Stirring is continued for another 3 minutes. Upon aging the reaction mixture at 80° C. in a closed vessel for 4 days a viscous sol having a viscosity of 20–25 Pas is obtained.

Said sol is directly cast or doctor blade coated onto polystyrene molds, drawing speeds of from 5 to 20 mm/s being employed. Then the polystyrene mold is covered and kept in an oven at temperatures of from 40 to 65° C. for 15 h. During said period of time the visous sol gels and a gel film free of tears and distortion can be removed, said film being dried at 20–30° C. for 3 h and subsequently at 50° C. for 15 h.

The gel films produced in said manner may be sintered in air at temperatures of up to 400° C. regardless of their thickness, which results in transparent glass films. Gel films having a thickness below 50 μm may be sintered in air at up to 1000° C. without tear formation to form transparent glass films.

In the case of sintering thicker films in nitrogen in the range of from 400 to 1250° C. mechanically and thermally stable black glass films are formed, which films do not show any visible change upon subsequently heating to 1300° C. The thermo-mechanical properties thereof approximately correspond to those of pure silica glass.

In the case of sintering in an atmosphere of ammonia at temperatures of up to 1000° C., tearfree glass films of excellent transparency may be obtained also with thicker gel films. The $SiO_2$ films sintered in ammonia exhibit better chemical and thermal stabilities and higher breaking strengths, microhardness and higher temperature-resistance than pure silica glass.

EXAMPLE 2

In order to prepare photochromic glass films a $1 \times 10^{-3}$ solution of a photochromic spiropyran dye in methanol is prepared and 1 ml of said solution is added dropwise to 10 ml of the sol prepared as in Example 1 and showing a solids content of almost 30% by weight. The further processing is carried out as described in Example 1.

EXAMPLE 3

In order to prepare magnetic glass films, 2.5 ml of a suspension of nanoscaled maghemite particles having a primary particle size of 10 nm and a solids content of 6% by weight are added dropwise to the sol prepared as in Example 1. The further processing is carried out as described in Example 1, the sintering in air resulting in transparent, reddish brown colored magnetic glass films.

We claim:

1. A process for the production of a thin $SiO_2$ film which comprises:

hydrolysis and condensation of (a) 40 to 100% by weight of one or more silanes of general formula (I)

$$R_x\text{—Si—}A_{4-x} \qquad (I)$$

wherein the radicals A are the same or different and represent hydroxyl groups or hydrolytically removable groups, the radicals R are the same or different and represent hydrolytically non-removable groups, and x is 0, 1, 2, or 3, provided that $x \geqq 1$ in at least 70% by moles of said silanes;

optionally in the presence of (b) 0 to 50% by weight of colloidal $SiO_2$ and/or (c) 0 to 10% by weight of an organic binder; processing the resulting viscous sol into a gel film, and heat-treatment of said gel film.

2. A process according to claim 1 wherein said hydrolysis and condensation are carried out in the presence of an acidic or basic condensation catalyst.

3. A process according to claim 1 wherein the hydrolyzed and condensed product is converted into a viscous sol by tempering at temperatures of from 40 to 120° C. for several hours to several days.

4. A process according to claim 1 wherein said sol is processed into a gel film on a non-adhesive base.

5. A process according to claim 1 wherein said gel film is dried and heat-treated at temperatures of up to 1400° C.

6. A process according to claim 1 wherein the silanes comprise 90% by moles methyltriethoxysilane and 10% by moles tetraethoxysilane.

7. A process according to claim 1 wherein colloidal $SiO_2$ is present.

8. A thin $SiO_2$ film produced by a process wherein:

(a) 40 to 100% by weight of one or more silanes of general formula (I)

$$R_x\text{—Si—}A_{4-x} \qquad (I)$$

wherein the radicals A are the same or different and represent hydroxyl groups or hydrolytically removable groups, the radicals R are the same or different and represent hydrolytically non-removable groups, and x is 0, 1, 2, or 3, provided that $x \geqq 1$ in at least 70% by moles of said silanes; optionally in the presence of (b) 0 to 50% by weight of colloidal $SiO_2$ and/or (c) 0 to 10% by weight of an organic binder are hydrolyzed and condensed, the resulting viscous sol is processed into a gel film, and said gel film is heat-treated.

9. A thin $SiO_2$ film according to claim 8 having a thickness of from 2.5 to 250 μm and a surface area of at least 25 $cm^2$.

10. A membrane, filter, component of a laminate, or support material having functional additives incorporated therein, comprising a thin $SiO_2$ film according to claim 9.

11. A thin $SiO_2$ film according to claim 9 wherein the silanes comprise 90% by moles methyltriethoxysilane and 10% by moles tetraethoxysilane.

12. A thin $SiO_2$ film according to claim 9 wherein colloidal $SiO_2$ is present.

13. A thin $SiO_2$ film according to claim 9 wherein said sol is processed into a gel film on a non-adhesive base.

14. A membrane, filter, component of a laminate, or support material having functional additives incorporated therein, comprising a thin $SiO_2$ film according to claim 8.

15. A thin $SiO_2$ film according to claim 8 wherein the silanes comprise 90% by moles methyltriethoxysilane and 10% by moles tetraethoxysilane.

16. A thin $SiO_2$ film according to claim 8 wherein colloidal $SiO_2$ is present.

17. A thin $SiO_2$ film according to claim 8 wherein said sol is processed into a gel film on a non-adhesive base.

* * * * *

UNITED STATES PATENT AND TRADEMARK OFFICE
CERTIFICATE OF CORRECTION

PATENT NO. : 6,017,389
DATED      : Jan. 25, 2000
INVENTOR(S) : Schmidt et al.

It is certified that error appears in the above-identified patent and that said Letters Patent is hereby corrected as shown below:

Title Page  [73] Assignee: "Institute fuer neue Materialen gemeinnuetzige GmbH, Saarbruecken, Germany" should read
-- Institut für neue Materialien gemeinnützige GmbH, Saarbrücken, Germany --.

Signed and Sealed this

Twenty-seventh Day of March, 2001

Attest:

NICHOLAS P. GODICI

*Attesting Officer*    *Acting Director of the United States Patent and Trademark Office*